US012136307B2

(12) United States Patent
Irie et al.

(10) Patent No.: US 12,136,307 B2
(45) Date of Patent: Nov. 5, 2024

(54) GATE APPARATUS, CONTROL METHOD OF GATE APPARATUS, AND STORAGE MEDIUM

(71) Applicant: NEC Corporation, Tokyo (JP)

(72) Inventors: Fumi Irie, Tokyo (JP); Yoshitaka Yoshimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 69 days.

(21) Appl. No.: 17/796,332

(22) PCT Filed: Feb. 18, 2020

(86) PCT No.: PCT/JP2020/006191
§ 371 (c)(1),
(2) Date: Jul. 29, 2022

(87) PCT Pub. No.: WO2021/166059
PCT Pub. Date: Aug. 26, 2021

(65) Prior Publication Data
US 2023/0065328 A1 Mar. 2, 2023

(51) Int. Cl.
*G07C 9/15* (2020.01)
*G07C 9/25* (2020.01)
*G07C 9/27* (2020.01)

(52) U.S. Cl.
CPC ............... *G07C 9/15* (2020.01); *G07C 9/257* (2020.01); *G07C 9/27* (2020.01); *G07C 2209/08* (2013.01)

(58) Field of Classification Search
CPC . G07C 9/15; G07C 9/27; G07C 9/257; G07C 2209/08; G07C 9/20; G07C 9/00; G07C 9/21; G07C 9/215; G07C 9/22; G07C 9/28; G07C 9/29; G07C 9/00896; G07C 2011/04; G07C 2209/63; G06K 19/00; G06K 19/005; G06K 19/02; G06K 19/04; G06K 19/06; G06K 17/0022; G06K 19/10; G07B 15/00
See application file for complete search history.

(56) References Cited

U.S. PATENT DOCUMENTS 7,190,254 B2 * 3/2007 Ogihara .................. G07C 9/27
235/382
2002/0145505 A1 10/2002 Sata

FOREIGN PATENT DOCUMENTS

JP 2017-010269 A 1/2017
JP 2018109935 A * 7/2018
JP 7279784 B2 * 5/2023 ............ G06Q 10/02
WO 2018/061812 A1 4/2018

OTHER PUBLICATIONS

International Search Report for PCT Application No. PCT/JP2020/006191, mailed on Apr. 14, 2020.

(Continued)

*Primary Examiner* — James J Yang
*Assistant Examiner* — Anthony D Afrifa-Kyei
(74) *Attorney, Agent, or Firm* — Sughrue Mion, PLLC

(57) ABSTRACT

A gate apparatus includes a progress indicator and a control unit. The progress indicator indicates the progress of the procedures related to emigration and immigration examination of the examination target user. The control unit controls the progress indicator depending on the nationality of the examination target user.

11 Claims, 13 Drawing Sheets

(56) References Cited

OTHER PUBLICATIONS

Written opinion for PCT Application No. PCT/JP2020/006191, mailed on Apr. 14, 2020.
Ministry of Justice, "Operation of Automated Gates (Notice)," [online], [2019]. [retrieved December], Internet URL:http://www.moj.go.jp/nyuukokukanri/kouhou/nyuukokukanri01_00111.html.
Measures for Safety of IC Passports described in https://www.mofa.go.jp/mofaj/toko/passport/ic_faq.html#11.
Extended European Search Report for EP Application No. 20919883.7, dated on Feb. 24, 2023.

* cited by examiner

EMIGRATION AND IMMIGRATION EXAMINATION SYSTEM

GATE APPARATUS, CONTROL METHOD OF GATE APPARATUS, AND STORAGE MEDIUM

This application is a National Stage Entry of PCT/JP2020/006191 filed on Feb. 18, 2020, the contents of all of which are incorporated herein by reference, in their entirety.

TECHNICAL FIELD

The present invention relates to a gate apparatus, a control method of a gate apparatus, and a storage medium.

BACKGROUND ART

Emigration and immigration examination is performed at airports. An officer in charge of the emigration and immigration examination compares a photograph of a face attached to a passport and the face of a person in front of the officer. If the face image in the passport does not match the face of the person in front of the officer, the emigration and immigration of the person is not permitted.

In recent years, apparatuses that automatically perform the above emigration and immigration examination have been introduced. For example, in the gate apparatus disclosed in Non-Patent Literature 1, emigration and immigration examination is performed by comparing the pre-registered biological information with the biological information acquired by the gate apparatus.

CITATION LIST

Non Patent Literature

[NPL 1] Ministry of Justice, "Operation of Automated Gates (Notice)," [online], [2019]. [retrieved December], Internet <URL:http://www.moj.go.jp/nyuukokukanri/kouhou/nyuukokukanri01_00111.html>

SUMMARY OF INVENTION

Technical Problem

In the emigration and immigration examination, the content thereof differs between Japanese and foreigners. Specifically, the emigration and immigration examination for foreigners requires the acquisition of information described on ED (Embarkation Disembarkation) cards or the like.

Thus, the examination content differs for Japanese and foreigners, but it is difficult to install dedicated devices (gate apparatus such as those disclosed in NPL 1) for each in airports. The reason for this is that the number of each varies depending on the time of day and other factors, making it inefficient. Therefore, it is realistic that a single apparatus can handle both Japanese and foreigners' examination.

However, if such an apparatus configuration is adopted, a situation may arise where examination is completed quickly by one device and not easily by another due to the difference in examination content between Japanese and foreigners. In this case, users waiting for emigration and immigration examination may not know which apparatus to line up in front of, and users who line up at the examination apparatus where examination is slow may become frustrated.

It is a principal object of the present invention to provide a gate apparatus, a control method of a gate apparatus, and a storage medium that contribute to users being able to easily grasp the status of emigration and immigration examination.

Solution to Problem

According to a first aspect of the present invention, there is provided a gate apparatus including: a progress indicator that indicates progress of procedures related to emigration and immigration examination of an examination target user; and a control unit that controls the progress indicator depending on the nationality of the examination target user.

According to a second aspect of the present invention, there is provided a control method of a gate apparatus including a progress indicator that indicates progress of procedures related to an emigration and immigration examination of an examination target user, the method including: identifying a nationality of the examination target user; and controlling the progress indicator depending on the identified nationality of the examination target user.

According to a third aspect of the present invention, there is provided a computer-readable storage medium storing a program that causes a computer mounted on a gate apparatus, the gate apparatus being including a progress indicator that indicates progress of procedures related to an emigration and immigration examination of an examination target user, to perform processing for: identifying a nationality of an examination target user; and controlling a progress indicator depending on the identified nationality of the examination target user.

Advantageous Effects of Invention

The individual aspects of the present invention provide a gate apparatus, a control method of a gate apparatus, and a storage medium that contributes to users being able to easily grasp status of emigration and immigration examination. The advantageous effects of the present invention are not limited to the above advantageous effect. The present invention may provide other advantageous effects, instead of or in addition to the above advantageous effect.

EXAMPLE EMBODIMENT

Figure 1:
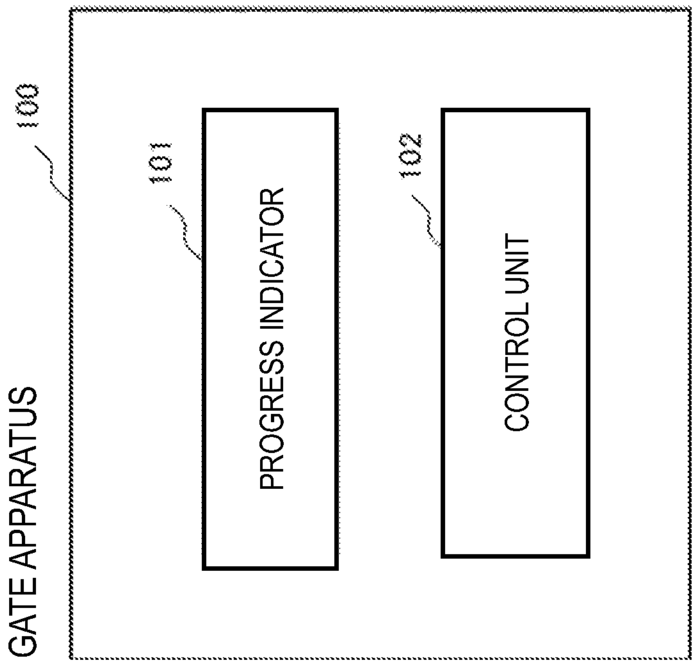
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A gate apparatus 100 according to an example embodiment includes a progress indicator 101 and a control unit 102 (see FIG. 1). The progress indicator 101 indicates progress of procedures related to an emigration and immigration examination of an examination target user. The control unit 102 controls the progress indicator 101 depending on the nationality of the examination target user.

The gate apparatus 100 includes for example the progress indicator 101 that visually and intuitively expresses the progress of the procedures related to the emigration and immigration of the examination target user. Furthermore, the gate apparatus 100 controls the progress indicator 101 so that a person waiting for examination can predict a timing (time) when the emigration and immigration examination in progress will be completed, for example, regardless of the nationality of the examination target user. The person waiting for examination who visually recognize a display transition (animation) of the progress indicator 101 can easily grasp a status related to the emigration and immigration examination in progress and predict a completion of the emigration and immigration examination.

Hereinafter, specific example embodiments will be described in more detail with reference to the accompanying drawings.

First Example Embodiment

A first example embodiment will be described in more detail with reference to drawings.

[System Configuration]

Figure 2:
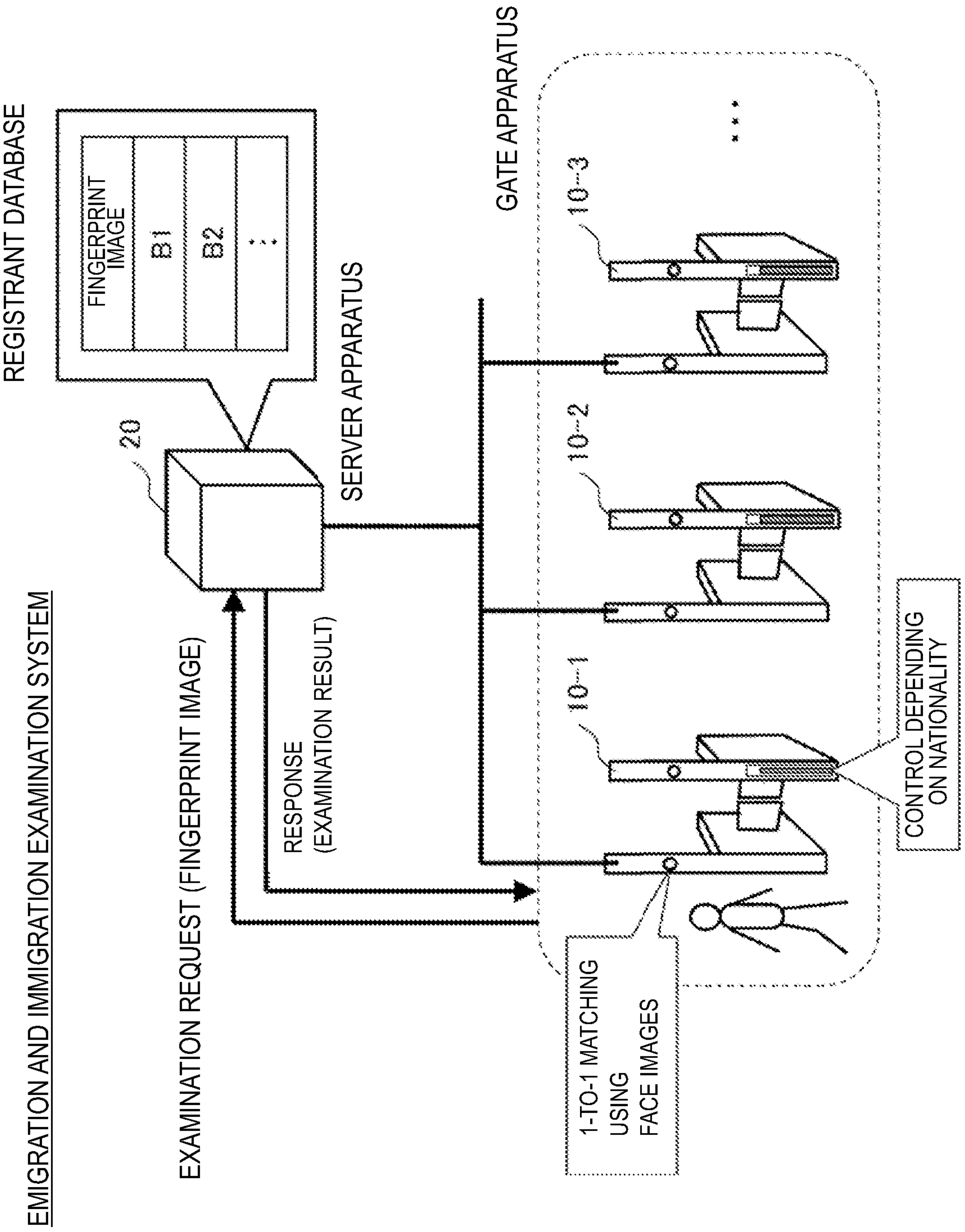
FIG. 2 is a diagram illustrating an example of a schematic configuration of an emigration and immigration examination system according to a first example embodiment.

FIG. 2 is a diagram illustrating an example of a schematic configuration of an emigration and immigration examination system according to the first example embodiment. As illustrated in FIG. 2, the emigration and immigration examination system includes a plurality of gate apparatuses 10-1 to 10-3 and a server apparatus 20. In the following description, unless there is a particular reason to distinguish the gate apparatuses 10-1 to 10-3 from each other, any one of these gate apparatuses 10-1 to 10-3 will simply be referred to as a "gate apparatus 10". In addition, while three gate apparatuses 10 are illustrated in FIG. 2, the number of gate apparatuses 10 included in the system is not of course limited to any particular number. The emigration and immigration examination system may include at least one or more gate apparatus 10.

The gate apparatuses 10 and the server apparatus 20 are configurated to be able to communicate with each other via wired or wireless communication means. The server apparatus 20 may be placed in the same airport where the gate apparatuses 10 are placed. Alternatively, the server apparatus 20 may be placed on a network (cloud).

The gate apparatus 10 is an apparatus that automatically performs an emigration and immigration examination procedure for users. The gate apparatus 10 includes a gate that can be opened and closed. If the gate apparatus 10 determines that a person located in front of the gate apparatus 10 passes through the emigration and immigration examination and possesses a correct passport, the gate apparatus 10 opens the gate and permits the examination target user to pass through the gate. In this way, the gate apparatus 10 controls the gate based on the result of the emigration and immigration examination of the examination target user.

The server apparatus 20 is an apparatus that realizes the emigration and immigration examination by the above gate apparatus 10. The server apparatus 20 stores information about users who can use the gate apparatus 10 (the information will hereinafter be referred to as gate user information).

A user who wishes to be automatically examined by the gate apparatus 10 must previously register with the system. For example, the user goes to a passport issuing office or the like and submits their passport to an officer in charge. The officer in charge examines whether the user who provided their passport is a passport possessor. As a result of the examination, the officer in charge who determines that the user is a correct passport possessor acquires the fingerprint image of the user. Specifically, the fingerprint image is acquired using a fingerprint scanner or the like. The fingerprint image is input to the server apparatus 20.

The server apparatus 20 adds the acquired fingerprint images to database (hereinafter referred to as the registrant database). The fingerprint image to be registered should be a fingerprint image taken from at least one or more fingers. Furthermore, in addition to the fingerprint images of users who have passed the examination, other information (e.g., name, passport number) may be registered in the registrant database in association with the fingerprint images. Alternatively, feature values (such as types and positions of feature points) necessary for the matching processing using fingerprint images may be registered in the registrant database in association with the fingerprint images.

[Schematic Operation in System]

Next, a schematic operation in the emigration and immigration examination system according to the first example embodiment will be described with reference to FIG. 2.

When users arrive in front of the gate apparatus 10, they follow the instructions of the gate apparatus 10 to open the passport in their possession and place it on a scanner. The gate apparatus 10 reads out the information described in the machine readable zone (Machine Readable Zone; MRZ) of the opened passport (hereinafter referred to as "MRZ information").

The gate apparatus 10 identifies the nationality of the examination target user from the MRZ information. The gate apparatus 10 controls the “progress indicator” depending on the identified nationality. The progress indicator is means for visually and sensuously notifying other users (persons waiting for examination) and others of progress of procedures (examination process by the gate apparatus 10) related to emigration and immigration examination of the examination target user. The person waiting for examination is a user who is in line in front of the gate apparatus 10 to undergo emigration and immigration examination by the gate apparatus 10.

Any expression format can be used for the progress indicator, for example, an expression format in which a vertical bar is prepared and the color of the bar changes from the top to the bottom as the procedure progresses can be considered. For example, the entire bar is filled with black at the beginning of the procedure, the black area turns white as the procedure progresses, and the entire bar turns white at the completion of the procedure.

Alternatively, the progress indicator may consist of a plurality of scales, with each scale decreasing as the procedure progresses.

Thus, the progress indicator is configured to display a continuous animation depending on the progress of the procedure related to the examination of the gate apparatus 10.

The gate apparatus 10 controls the display of the progress indicator depending on the nationality (Japanese or foreign) of the examination target user. The details are described below, but the gate apparatus 10 controls the progress indicator so that the person waiting for the examination can recognize with a certain degree of accuracy when the emigration and immigration examination in progress is completed (time required for emigration and immigration examination), regardless of the nationality of the examination target user.

In other words, a person waiting for the examination who visually recognizes the progress indicator can intuitively grasp which of the gate apparatus 10 will finish the emigration and immigration examination earlier.

The gate apparatus 10 starts controlling the progress indicator when the nationality of the examination target user can be acquired from the MRZ information, and the control of the progress indicator is terminated when the emigration and immigration examination of the examination target user is completed.

As mentioned above, the contents of emigration and immigration examination are different between Japanese and foreigners. If the examination target user is Japanese, the main contents of the examination are determination that the person possesses a correct passport and determination that a fingerprint image is registered in the server apparatus 20. In contrast, if the examination target user is a foreigner, entering the prescribed information and other procedures are required between the above two determinations. Specifically, if the examination target user is a foreigner, it is necessary to enter ED information or the like.

The following is a brief description of the examination procedure by the gate apparatus 10.

The gate apparatus 10 determines whether the examination target user possesses a correct passport (a user’s own passport). The gate apparatus 10 reads out the face image or the like from the IC (Integrated Circuit) chip of the passport using the card reader function of the scanner. At that time, MRZ information is used.

The gate apparatus 10 acquires the user’s face image using a camera device. The gate apparatus 10 generates feature values (hereinafter referred to as facial feature values) from each of the two face images and determines whether the two feature values substantially match. That is, the gate apparatus 10 performs 1-to-1 matching using facial feature values obtained by photographing the user in front of the gate apparatus 10 and facial feature values obtained from the face image stored in the passport’s IC chip.

The gate apparatus 10 determines that the examination target user possesses a correct passport when 1-to-1 matching is successful.

In the case of foreigners, the gate apparatus 10 reads the prescribed information. For example, the gate apparatus 10 instructs the foreign examination target user to place the ED card on a scanner. The gate apparatus 10 reads out the information described on the ED card using the scanner. If the gate apparatus 10 successfully reads the ED card, it proceeds to the next examination procedure. The examination procedure (reading of the prescribed information) is not required for Japanese.

If the above 1-to-1 matching is successful (in the case of foreigners, if the necessary information is successfully acquired in addition to the above successful 1-to-1 matching), the gate apparatus 10 instructs the examination target user to place a finger on the scanner. The gate apparatus 10 acquires the user’s fingerprint image and sends an examination request including the acquired fingerprint image to a server apparatus 20.

The server apparatus 20 performs matching process (1-to-N matching; N is a positive integer, the same hereinafter) using the acquired fingerprint image and multiple fingerprint images registered in the registrant database. If a fingerprint image that substantially matches the acquired fingerprint image is registered in the registrant database, the server apparatus 20 sets the examination result to “Permission of emigration and immigration”.

In contrast, if a fingerprint image that substantially matches the acquired fingerprint image is not registered in the registrant database, the server apparatus 20 sets the examination result to “Non-permission of emigration and immigration”. The server apparatus 20 replies the examination result to the gate apparatus 10 which is the transmission source of the examination request.

If the examination target user is Japanese, the gate apparatus 10 opens the gate and allows the user to pass through the gate when the examination target user possesses a correct passport and the result of the examination by the server apparatus 20 is “Permission of emigration and immigration”. If the examination target user is a foreigner, the gate apparatus 10 opens the gate on the condition that the necessary information (e.g., ED card information) has been acquired in addition to the above two conditions.

Next, the individual apparatuses included in the emigration and immigration examination system according to the first example embodiment will be described in detail.

[Server Apparatus]

Figure 3:
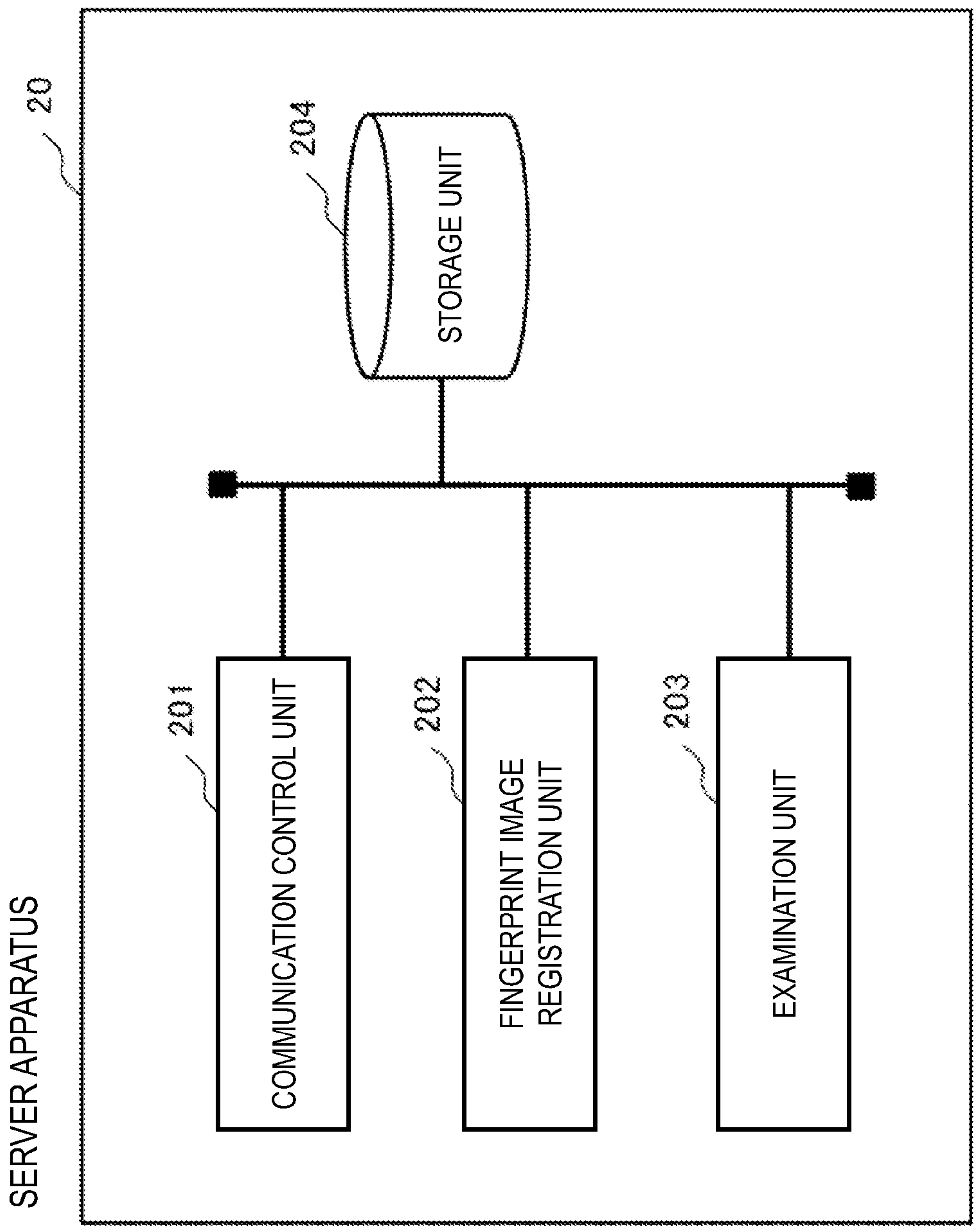
FIG. 3 is a diagram illustrating an example of a processing configuration of a server apparatus according to the first example embodiment.

FIG. 3 is a diagram for illustrating an example of a processing configuration (processing modules) of the server apparatus 20 according to the first example embodiment. As illustrated in FIG. 3, the server apparatus 20 includes a communication control unit 201, a fingerprint image registration unit 202, an examination unit 203, and a storage unit 204.

The communication control unit 201 is means for controlling communication with other apparatuses. Specifically, the communication control unit 201 receives data (packets)

from the gate apparatus 10. In addition, the communication control unit 201 transmits data to the gate apparatus 10.

The fingerprint image registration unit 202 is means for registering the acquired fingerprint image into the registrant database established in the storage unit 204. Any method can be used for acquiring the fingerprint image.

For example, an officer in charge at the passport issuance counter may enter the fingerprint image into the server apparatus 20. Specifically, an officer in charge operates a fingerprint scanner to acquire the user's fingerprint image. The officer in charge operates a terminal (a computer installed at the issuance counter) and transmits the above acquired fingerprint image to the server apparatus 20. Alternatively, the above read data may be entered into the server apparatus 20 via an external storage device, such as a USB (Universal Serial Bus) memory.

The examination unit 203 is means for processing examination requests transmitted by the gate apparatus 10. Specifically, the examination unit 203 sets the fingerprint image (biological information) included in the examination request as the matching target and performs the matching process between this fingerprint image and the fingerprint image registered in the registered user database.

More specifically, the examination unit 203 sets the fingerprint image retrieved from the examination request as the matching target, and performs a one-to-N matching between this fingerprint image and a plurality of fingerprint images registered in the registrant database. The examination unit 203 calculates a score (similarity) between the fingerprint image as the matching target and each of the plurality of fingerprint images on the registering sides.

The examination unit 203 extracts feature points (end points and branch points) from the fingerprint images of the matching sides and registering sides, respectively. The examination unit 203 calculates a score indicating the similarity of the two fingerprint images based on the extracted feature points, or the like. Specifically, the examination unit 203 matches the core areas (the central region of the fingerprint) of the two fingerprint images, and calculates the score based on the positions and numbers of the feature points seen from the core areas, the number of the core lines existing between the feature points, or the like. A higher score indicates a higher degree of similarity between two fingerprint images.

Existing techniques can be used in the process of extracting the feature points from the fingerprint images and in the process of calculating the scores from the feature points, which are obvious to those skilled in the art, and further explanation thereof will be omitted.

The examination unit 203 determines whether there is at least one or more of the fingerprint images in which the score between the plurality of fingerprint images registered in the registrant database and the fingerprint image as the matching target is greater than or equal to a predetermined value.

If the fingerprint image having a score equal to or greater than the predetermined value exists in the registrant database, the examination unit 203 sets the examination result to "Permission of emigration and immigration". In contrast, if the fingerprint image having a score equal to or greater than the predetermined value does not exist in the registrant database, the examination unit 203 sets the examination result to "Non-permission of emigration and immigration". The examination unit 203 transmits the examination result to the gate apparatus 10 which is the transmission source of the examination request.

The storage unit 204 stores various information necessary for the operation of the server apparatus 20. In addition, the registrant database is established in the storage unit 204.

Figure 4:
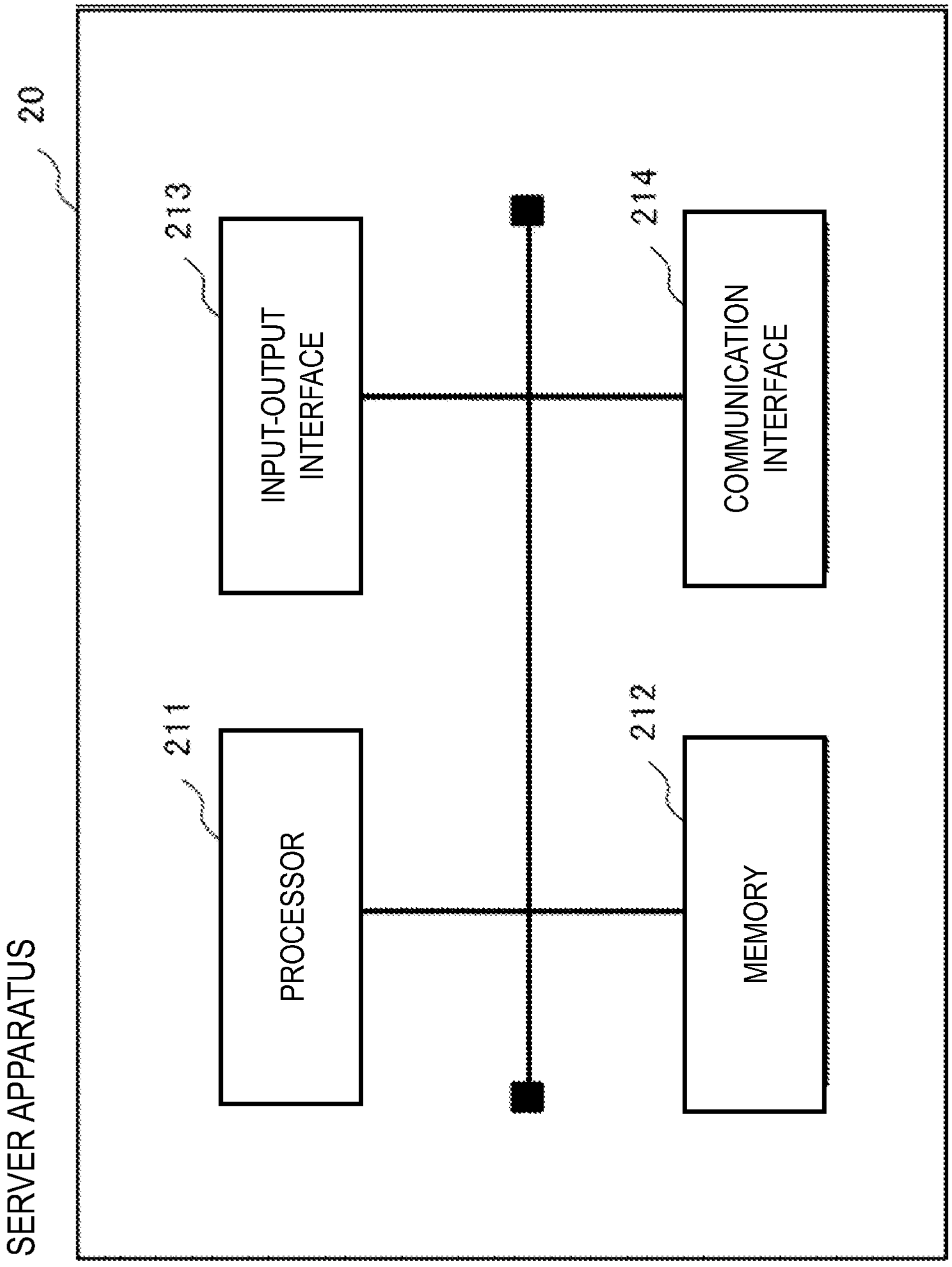
FIG. 4 is a diagram illustrating an example of a hardware configuration of a server apparatus according to the first example embodiment.

FIG. 4 is a diagram illustrating an example of a hardware configuration of the server apparatus 20. The server apparatus 20 can be configured by an information processing apparatus (a so-called computer) and includes a configuration illustrated as an example in FIG. 4. For example, the server apparatus 20 includes a processor 211, a memory 212, an input-output interface 213, a communication interface 214, etc. The components such as the above processor 211 are connected to an internal bus, etc. so that the components can mutually communicate with each other.

The hardware configuration of the server apparatus 20 is not limited to the configuration illustrated in FIG. 4. The server apparatus 20 may include hardware not illustrated or may be configured without the input-output interface 213 if desired. In addition, the number of components, such as the number of processors 211, included in the server apparatus 20 is not limited to the example illustrated in FIG. 4. For example, a plurality of processors 211 may be included in the server apparatus 20.

For example, the processor 211 is a programmable device such as a CPU (Central Processing Unit), an MPU (Micro Processing Unit), or a DSP (Digital Signal Processor). Alternatively, the processor 211 may be a device such as an FPGA (Field Programmable Gate Array) or an ASIC (Application Specific Integrated Circuit). The processor 211 executes various kinds of programs including an operating system (OS).

The memory 212 is a RAM (Random Access Memory), a ROM (Read-Only Memory), an HDD (Hard Disk Drive), an SSD (Solid State Drive), or the like. The memory 212 stores an OS program, an application program, and various kinds of data.

The input-output interface 213 is an interface for a display apparatus and an input apparatus not illustrated. For example, the display apparatus is a liquid crystal display or the like. For example, the input apparatus is an apparatus, such as a keyboard or a mouse, which receives user operations.

The communication interface 214 is a circuit, a module, or the like that communicates with other apparatuses. For example, the communication interface 214 includes a NIC (Network Interface Card) or the like.

The function of the server apparatus 20 is realized by various kinds of processing modules. The processing modules are realized, for example, by causing the processor 211 to execute a program stored in the memory 212. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

[Gate Apparatus]

Figure 5:
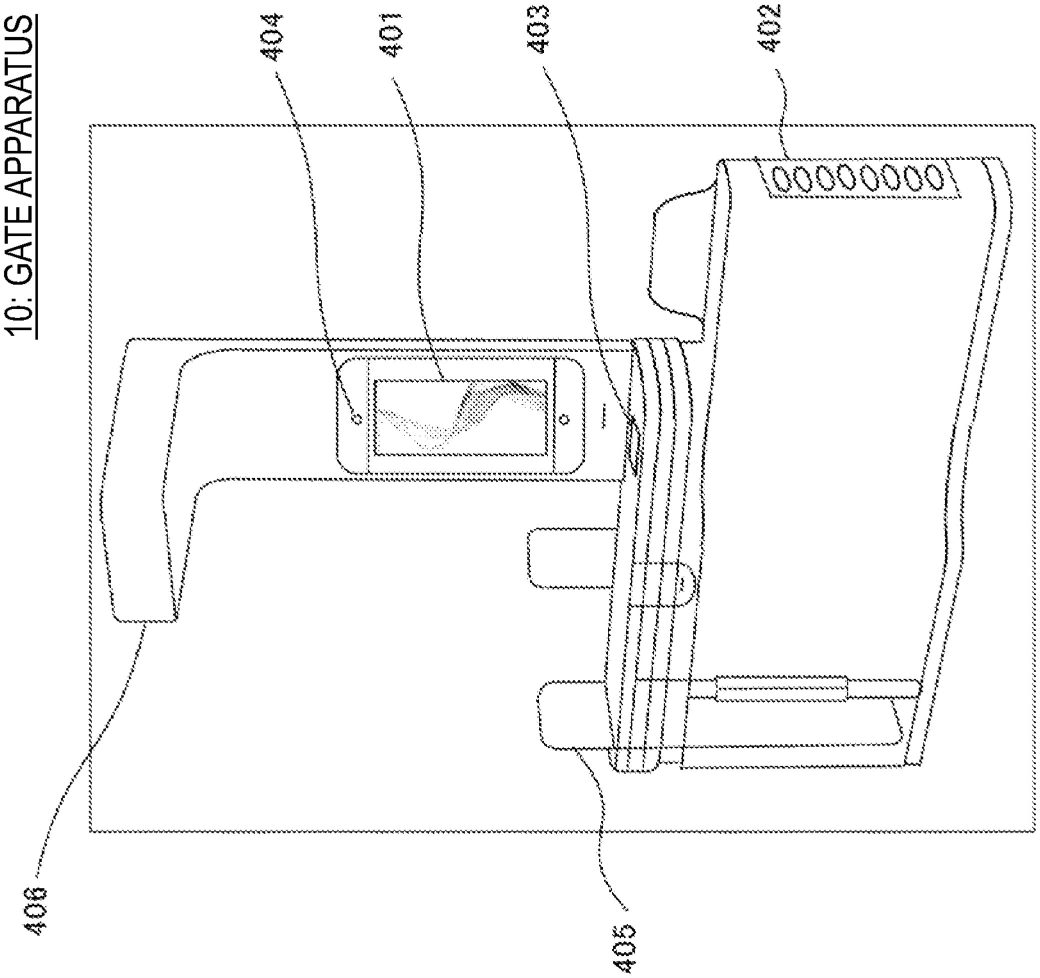
FIG. 5 is a diagram illustrating an example of an appearance of the gate apparatus according to the first example embodiment.

FIG. 5 is a diagram illustrating an example of the appearance of the gate apparatus 10 according to the first example embodiment. As mentioned above, the gate apparatus 10 is an apparatus that automatically performs an examination related to an emigration and immigration for users.

When the gate apparatus 10 detects the presence of a user in front of its own device, it displays on a display 401 the operating procedures or the like required for the user.

The gate apparatus 10 displays a progress level of the procedures related to the emigration and immigration on the progress indicator 402. The progress indicator 402 shown in FIG. 5 consists of a plurality of scales and displays a decreasing number of scales as the procedure progresses. The progress indicator 402 is installed in a position that is visible to the person waiting for examination. For example, as shown in FIG. 5, the progress indicator 402 may be installed on the protruding portion of the gate apparatus 10 (the forward overhang portion). Alternatively, the progress indicator 402 may be installed on a ceiling 406 of the gate apparatus 10.

The gate apparatus 10 instructs the user to open a page illustrating a photograph of the face of the passport in their possession and place the opened passport on a scanner 403. The gate apparatus 10 reads out the MRZ information on the passport.

The gate apparatus 10 identifies the nationality of the examination target user based on the read out MRZ information. The MRZ of the passport records the name, nationality, and other information of the examination target user.

Once the gate apparatus 10 identifies the nationality of the examination target user, it controls the progress indicator 402 depending on the identified nationality. The details of the control are described below.

The gate apparatus 10 uses the acquired MRZ information to acquire the face image stored in the passport's IC chip.

Next, the gate apparatus 10 notifies the examination target user that the face is to be photographed, and controls the camera device 404 to capture an image of the examination target user. Once the image of the examination target user has been captured, the gate apparatus 10 extracts the face area from the image and acquires a face image.

The gate apparatus 10 performs matching (1-to-1 matching) using the face image acquired from the camera device 404 and the face image acquired from the IC chip of the passport. If the matching is successful (the two face images substantially match), the gate apparatus 10 determines that the user possesses a correct passport. In contrast, if the matching fails (the two face images are different), the gate apparatus 10 determines that the user does not possess a correct passport.

If the examination target user is a foreigner, the gate apparatus 10 acquires the prescribed information (e.g., information described on the ED card). In this case, the gate apparatus 10 instructs the examination target user to place the ED card or the like on the scanner 403. The gate apparatus 10 controls the scanner 403 to read out the information from the ED cards or the like.

Next, the gate apparatus 10 instructs the user to place a finger (a predetermined finger; the finger corresponding to the fingerprint image registered in the registrant database) on the scanner 403. The gate apparatus 10 controls the scanner 403 to capture images of the placed finger. The gate apparatus 10 sends an examination request including the obtained fingerprint image to the server apparatus 20.

The gate apparatus 10 opens the gate 405 to allow the passage of the examination target user, at least when the examination result from the server apparatus 20 is "Permission of emigration and immigration" and the examination target user is determined to possess a correct passport.

If the examination result from the server apparatus 20 is determined to be "Non-permission of emigration and immigration" or "user does not possess a correct passport", the gate apparatus 10 keeps the gate 405 closed and a predetermined message or the like is displayed on a display 401. For example, the gate apparatus 10 displays an indication to go to a staffed examination booth or to redo an operation related to automated examination.

Figure 6:
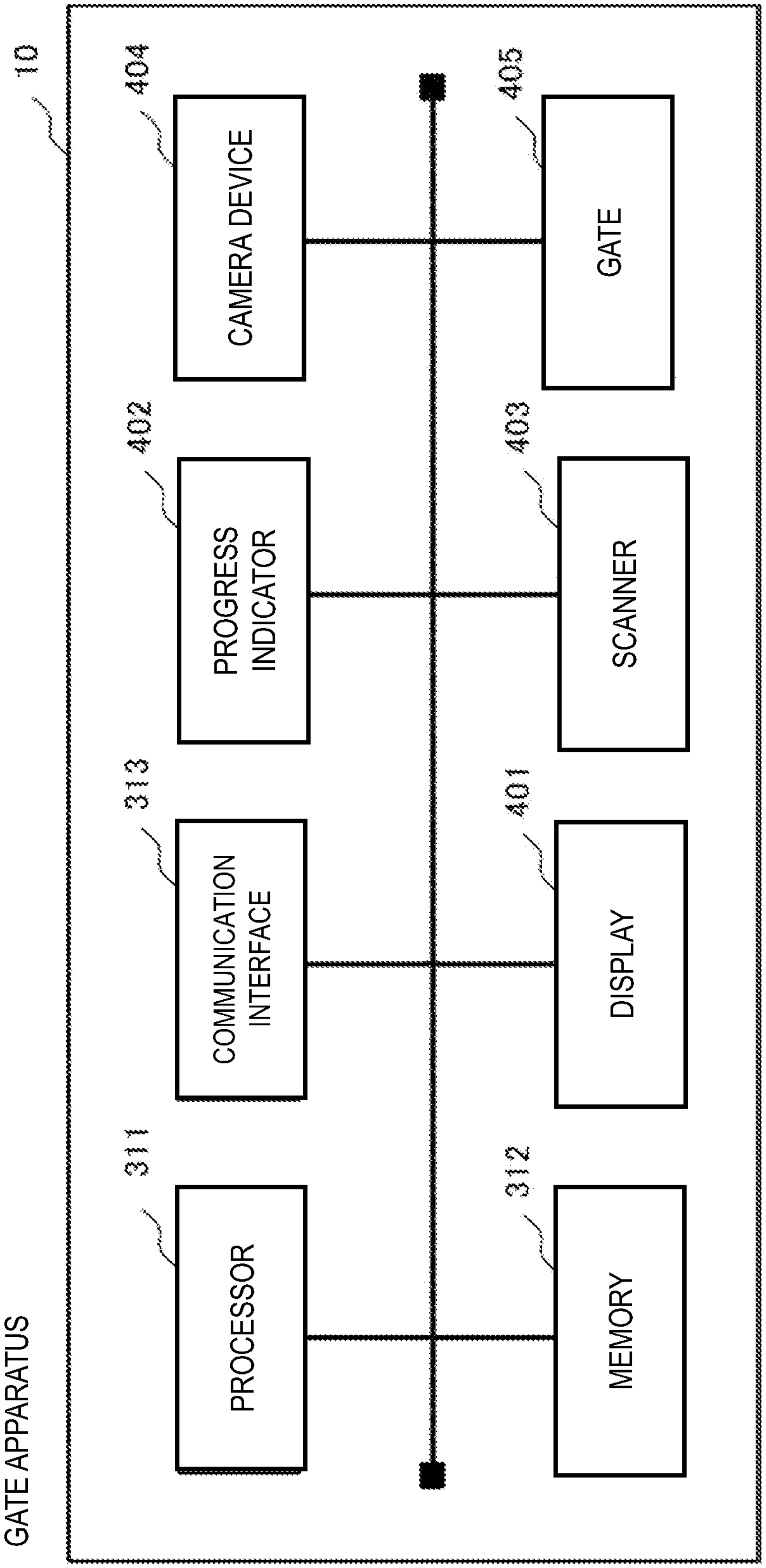
FIG. 6 is a diagram illustrating an example of a hardware configuration of the gate apparatus according to the first example embodiment.

FIG. 6 shows an example of the hardware configuration of the gate apparatus 10 according to the first example embodiment. Referring to FIG. 6, the gate apparatus 10 includes a processor 311, a memory 312, and a communication interface 313. Furthermore, the gate apparatus 10 includes the display 401, the progress indicator 402, the scanner 403, the camera device 404, and the gate 405. The components of the above processor 311 or the like are connected by an internal bus or the like and are configured to communicate with each other.

Since the processor 311, the memory 312, and the communication interface 313 may be equivalent to those of the server apparatus 20 described with reference to FIG. 4, detailed description thereof will be omitted.

The display 401 is a device (for example, a liquid crystal monitor) for outputting information.

The progress indicator 402 consists of a device such as LED (Light Emitting Diode) or liquid crystal panels, and displays based on instructions from the processor 311.

The scanner 403 is a device that reads out MRZ information from a passport or acquires a fingerprint image of the examination target user or information described on the ED card. In addition, the scanner 403 also includes a function of accessing the IC chip mounted on the passport. The scanner 403 can be installed at any location. However, it is preferable that the scanner 403 is installed at a location where the examination target user can easily place their passport or finger on the device. The present disclosure describes a case where the scanner 403 includes a plurality of functions. However, the functions included in the scanner 403 may be separated, and a plurality of single-function devices may be provided in the gate apparatus 10.

For example, the camera device 404 is a digital camera installed to be able to capture an image of the front side of the gate apparatus 10. The camera device 404 may be installed at any location. For example, the camera device 404 may be installed on the main body of the gate apparatus 10 or away from the gate apparatus 10. As long as the camera device 404 can photograph a user standing in front of the gate apparatus 10 (in particular, the face of the user), the camera device 404 may be installed in any location.

When a user passes the emigration and immigration examination, the gate 405 shifts from a closed state in a standby status in which the gate 405 blocks passage of the user to an opened state in which passage of the user is permitted. The mechanism of the gate 405 is not limited to any particular mechanism. For example, the gate 405 is a flap gate that opens and closes a flap installed on one side or flaps installed on both sides of the passage or is a turnstile gate that rotates three bars.

As with the server apparatus 20, the functions of gate apparatus 10 are realized by various kinds of processing modules. The processing modules are realized, for example, by causing the processor 311 to execute a program stored in the memory 312.

Figure 7:
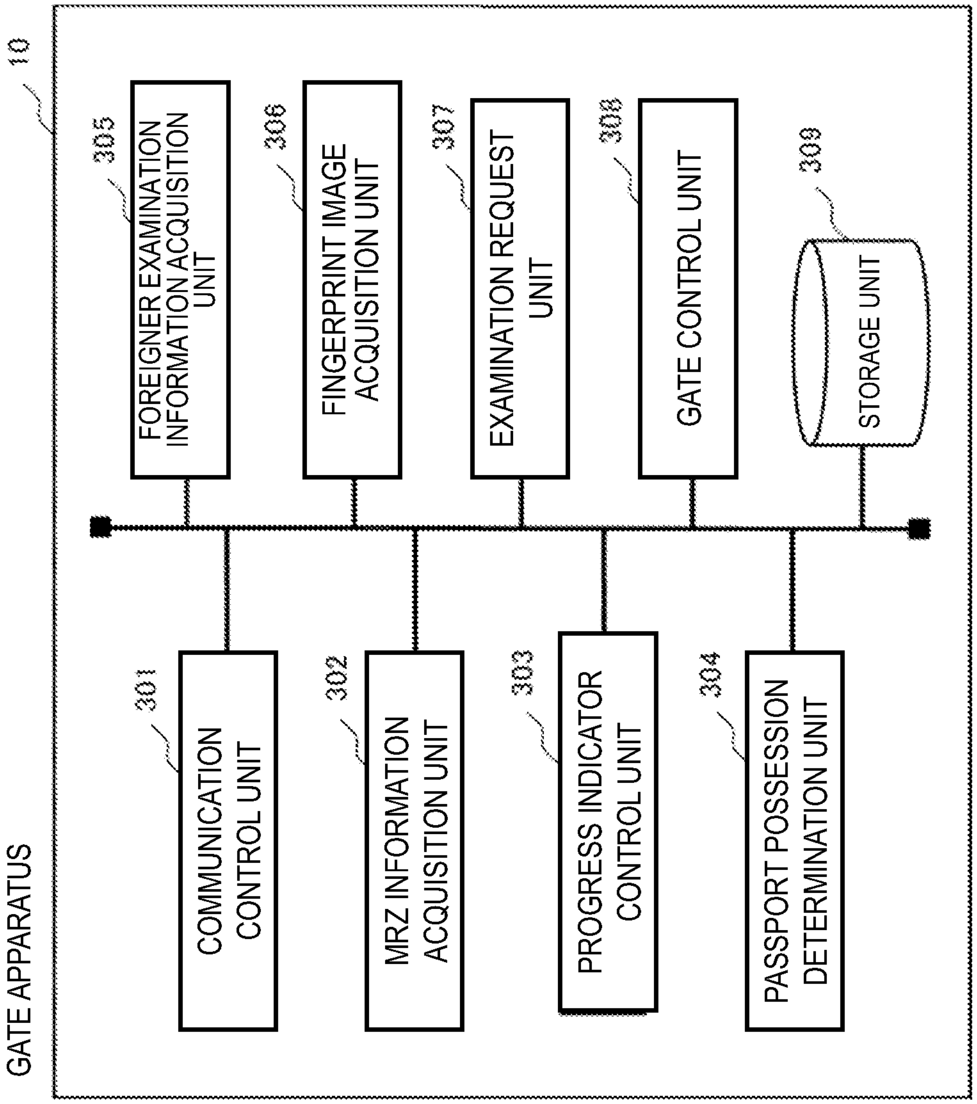
FIG. 7 is a diagram illustrating an example of a processing configuration of the gate apparatus according to the first example embodiment.

FIG. 7 is a diagram illustrating an example of a processing configuration (processing modules) of the gate apparatus 10 according to the first example embodiment. The gate apparatus 10 includes a communication control unit 301, an MRZ information acquisition unit 302, a progress indicator control unit 303, a passport possession determination unit 304, and a foreigner examination information acquisition unit

305. The gate apparatus 10 further includes a fingerprint image acquisition unit 306, an examination request unit 307, a gate control unit 308, and a storage unit 309.

The communication control unit 301 is means for controlling communication with other devices. Specifically, the communication control unit 301 receives data (packets) from the server apparatus 20. In addition, the communication control unit 301 transmits data toward the server apparatus 20.

The MRZ information acquisition unit 302 is means for acquiring information (MRZ information) described in the MRZ of the passport. The MRZ information acquisition unit 302 acquires MRZ information from a passport by controlling the scanner 403. The MRZ information acquisition unit 302 notifies the acquired MRZ information to the progress indicator control unit 303, the passport possession determination unit 304, and the foreigner examination information acquisition unit 305.

Figure 8:
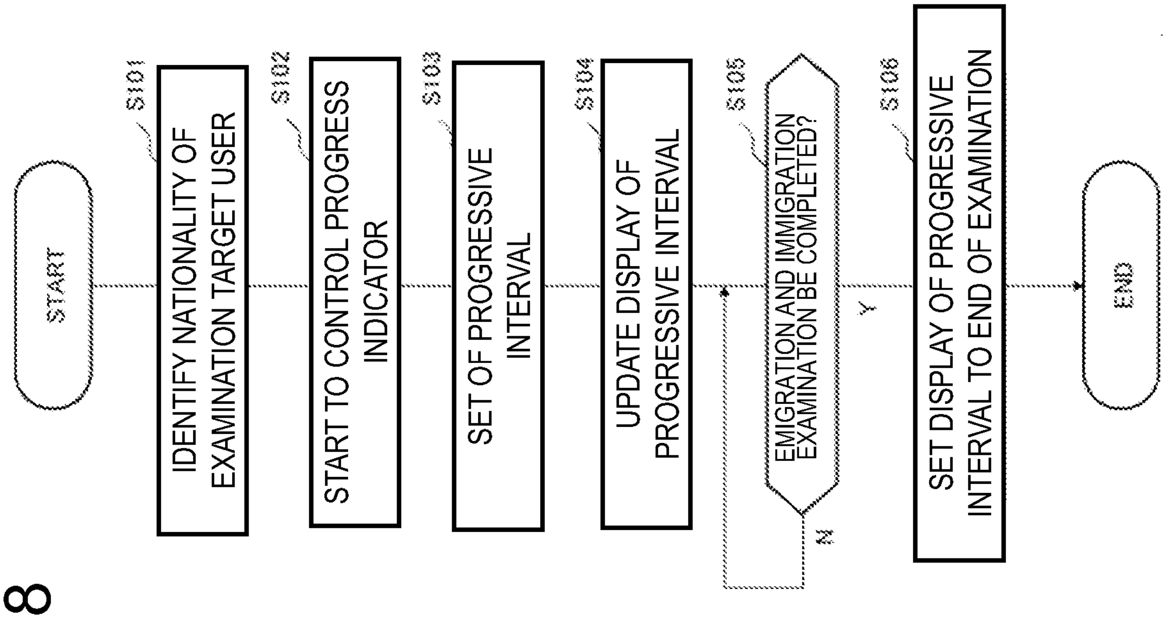
FIG. 8 is a flowchart illustrating an example of an operation of a progress indicator control unit according to the first example embodiment.

The progress indicator control unit 303 is means for controlling the progress indicator 402. FIG. 8 is a flowchart illustrating an example of the operation of the progress indicator control unit 303 according to the first example embodiment.

The progress indicator control unit 303 identifies whether the examination target user is Japanese (a user with Japanese nationality) or a foreigner (a user with nationality other than Japanese) from the acquired MRZ information (Step S101).

Figure 9A:
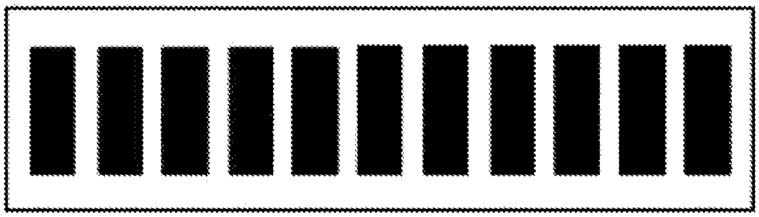
FIGS. 9A to 9D are diagrams illustrating the control of a progress indicator according to the first example embodiment.
Figure 9B:
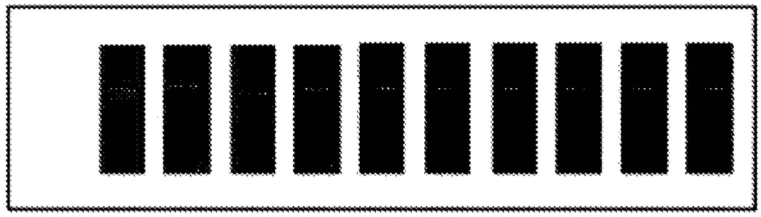

The progress indicator control unit 303 starts control of the progress indicator 402 (step 102). For example, if the progress indicator is an indicator with a scale of 11 steps as shown in FIG. 9A, the progress indicator control unit 303 reduces the scale by one to display as shown in FIG. 9B. That is, since the nationality of the examination target user is determined, the progress indicator control unit 303 starts controlling the progress indicator 402. The person waiting for the examination recognizes that the examination of the examination target user has started when the display on the progress indicator 402 begins to move (e.g., the scale decreases by one).

The progress indicator control unit 303 sets a progressive interval (step 103). The progressive interval is a parameter that defines the interval upon advancing the display of the progress indicator from the pre-examination state (initial state) toward the end-of-examination state. For example, if "10 seconds" is set as the progressive interval, the progress indicator control unit 303 will advance the display of the progress indicator by one step every 10 seconds.

A progress indicator control unit 303 changes a value to be set for the progressive interval depending on the nationality of the examination target user. Specifically, the progress indicator control unit 303 determines the value of the progressive interval, such as A seconds if the examination target user is Japanese and B seconds if the person is a foreigner. The value to be set for the progressive interval is previously stored in the gate apparatus 10.

There are various ways to determine the value to be set for the progressive interval. For example, the progressive interval value may be determined based on the average value of the time required for emigration and immigration examination. For example, if the progress indicator has 11 steps on the scale and the average examination time for Japanese is 60 seconds, then 6 seconds is set as the progressive interval. Similarly, if the progress indicator has 11 steps on the scale and the average examination time for foreigners is 120 seconds, then 12 seconds is set as the progressive interval.

Thus, the value to be set for the progressive interval is determined based on the average value of the time required for emigration and immigration examination for each user of different nationalities. In addition, more examination items (examination procedures) are required for foreigners than for Japanese, and it takes a longer time to complete the procedures. Therefore, the value of the progressive interval set when the examination target user is Japanese is smaller than the value of the progressive interval set when the examination target user is a foreigner.

The method for determining the value to be set for the above progressive interval is illustrative. For example, it may be determined based on the central value or the most frequent value of the time required for emigration and immigration examination for each user of different nationalities.

The progress indicator control unit 303 updates the display of the progress indicator 402 depending on the progressive interval (step 104). However, the progress indicator control unit 303 does not update the display of the progress indicator even when the time elapses and the last scale is turned off (the display of the progress indicator corresponds to the end of the examination). That is, even if the examination is delayed and the time for turning off the last scale arrives, the progress indicator control unit 303 leaves the last scale. Specifically, the progress indicator control unit 303 maintains the display shown in FIG. 9D until the examination is completed.

The progress indicator control unit 303 determines whether the emigration and immigration examination by the gate apparatus 10 has been completed (step 105). Specifically, the progress indicator control unit 303 determines that the emigration and immigration examination is completed when it receives the notice of "gate opening" from the gate control unit 308.

The progress indicator control unit 303 waits until the emigration and immigration examination is completed (No in step 105).

Figure 9C:

When the emigration and immigration examination is completed (Yes in step 105), the progress indicator control unit 303 sets the display of the progress indicator 402 to the state of completion of the examination (step S 106). Specifically, if there is a scale that is not turned off when the emigration and immigration examination is completed, the progress indicator control unit 303 turns off the scale that is not turned off. For example, as shown in FIG. 9C, if three scales remain at the end of the examination, the three scales are turned off. If the emigration and immigration examination is completed earlier than the average and 2 or more scales of the progress indicator 402 remain, all the remaining 2 or more scales are turned off at the end of the examination.

Figure 9D:

In contrast, if the emigration and immigration examination is completed later than the average, the last scale that has remained lit turns off with the completion of the emigration and immigration examination. In the example of FIGS. 9A to 9D, the last one scale shown in FIG. 9D is turned off.

The description is returned to FIG. 7. The passport possession determination unit 304 is means for determining whether the user possesses a correct passport. The passport possession determination unit 304 acquires MRZ information from the MRZ information acquisition unit 302. The passport possession determination unit 304 reads out the face image stored in the IC chip using the acquired MRZ information.

As described in "Measures for Safety of IC Passports" in the following reference document 1, information stored in an IC chip in a passport is encrypted (converted) by using MRZ information written in the same passport as a password.

<Reference Document 1> https://www.mofa.go.jp/mofaj/toko/passport/ic_faq.html#11

The passport possession determination unit 304 decrypt the information read out from the IC chip using the MRZ information acquired from the scanner 403, and acquires a face image stored in the IC chip.

In addition, the passport possession determination unit 304 acquires a face image (biological information) of the examination target user standing in front of the gate apparatus 10. Specifically, the passport possession determination unit 304 controls the camera device 404 to acquire a face image of the examination target user.

The passport possession determination unit 304 extracts the feature points from a face image obtained by photographing the examination target user and a face image obtained from the IC chip, respectively. Existing techniques can be used for the feature point extraction processing, thus a detailed description thereof will be omitted. For example, the passport possession determination unit 304 extracts the eyes, nose, mouth, or the like as feature points from the face image. Then, the passport possession determination unit 304 calculates the position of each of the feature points and the distance between each of the feature points as a feature value, and generates a feature vector (vector information characterizing a face image) consisting of a plurality of feature values.

The passport possession determination unit 304 calculates similarity of two feature quantities (feature vectors). A chi-square distance, an Euclidean distance or the like can be used for the similarity. The greater the distance is, the lower the similarity becomes, and the closer the distance is, the higher the similarity becomes.

The passport possession determination unit 304 determines that the matching is successful when the calculated similarity is equal to or greater than a predetermined value. That is, when the calculated similarity is equal to or greater than a predetermined value, the passport possession determination unit 304 determines that the two face images are images in which the faces of the same person are captured.

The passport possession determination unit 304 determines that the examination target user standing in front of it possesses a correct passport when the 1-to-1 matching is successful. The passport possession determination unit 304 notifies the gate control unit 308 of the determination result (whether the user possesses a correct passport).

The foreigner examination information acquisition unit 305 is means for acquiring information necessary for emigration and immigration examination regarding foreigners. For example, the foreigner examination information acquisition unit 305 acquires the information described on the ED card. The foreigner examination information acquisition unit 305 uses the display 401 to instruct to place the ED card or the like on the scanner 402, and acquires necessary information.

When the acquisition of necessary information is completed, the foreigner examination information acquisition unit 305 notifies the gate control unit 308 of the fact (completion of information acquisition).

As described above, the acquisition of such information is necessary only when the examination target user is a foreigner. Therefore, the foreigner examination information acquisition unit 305 performs the above operation when it is determined from the MRZ information that the examination target user is a foreigner. When the examination target user is a Japanese, the foreigner examination information acquisition unit 305 notifies the gate control unit 308 of the fact (completion of information acquisition) in order to proceed with the procedure.

The fingerprint image acquisition unit 306 is means for acquiring the fingerprint image of the examination target user. The fingerprint image acquisition unit 306 controls the scanner 403 to acquire the fingerprint image of the examination target user. The fingerprint image acquisition unit 306 delivers the acquired fingerprint image to the examination request unit 307.

The examination request unit 307 is means for requesting the examination regarding the emigration and immigration of the examination target user from the server apparatus 20. Specifically, the examination request unit 307 generates an examination request including the acquired fingerprint image (biological information), and transmits the generated examination request to the server apparatus 20 via the communication control unit 301.

Figure 10:
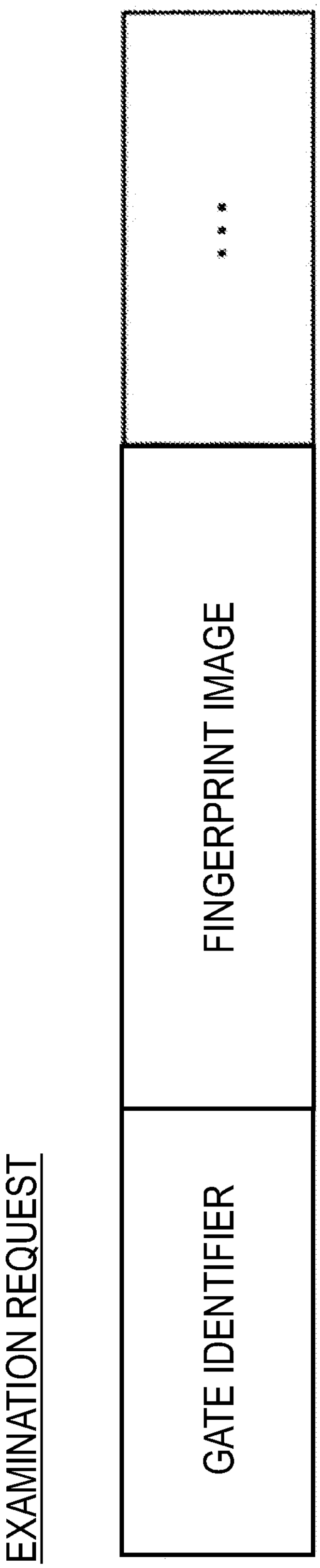
FIG. 10 is a diagram illustrating an example of an examination request.

For example, the examination request unit 307 generates the examination request including an identifier of its own device (hereinafter referred to as a gate identifier), a fingerprint image, or the like (see FIG. 10). A MAC (Media Access Control) address or the IP (Internet Protocol) address of the gate apparatus 10 can be used as the gate identifier.

The examination request unit 307 receives a response from the server apparatus 20 against the examination request via the communication control unit 301. The examination request unit 307 delivers a response (examination result; permission of emigration and immigration or non-permission of emigration and immigration) from the server apparatus 20 to the gate control unit 308.

The gate control unit 308 is means for controlling the gate 405 provided in the gate apparatus 10. The gate control unit 308 opens the gate 405 when the passport possession determination result is “Passport possession”, the examination result of the server apparatus 20 is “Permission of emigration and immigration”, and the notice of the completion of information acquisition is received from the foreigner examination information acquisition unit 305.

When the gate 405 is opened, the gate control unit 308 notifies the progress indicator control unit 303 of the fact. In addition, the gate control unit 308 closes the gate 405 after the examination target user permitted to pass through the gate 405 passes through the gate 405.

The storage unit 309 is means for storing information necessary for the operation of the gate apparatus 10.

[Operation in Emigration and Immigration Examination System]

Next, an operation in the emigration and immigration examination system according to the first example embodiment will be described.

Figure 11:
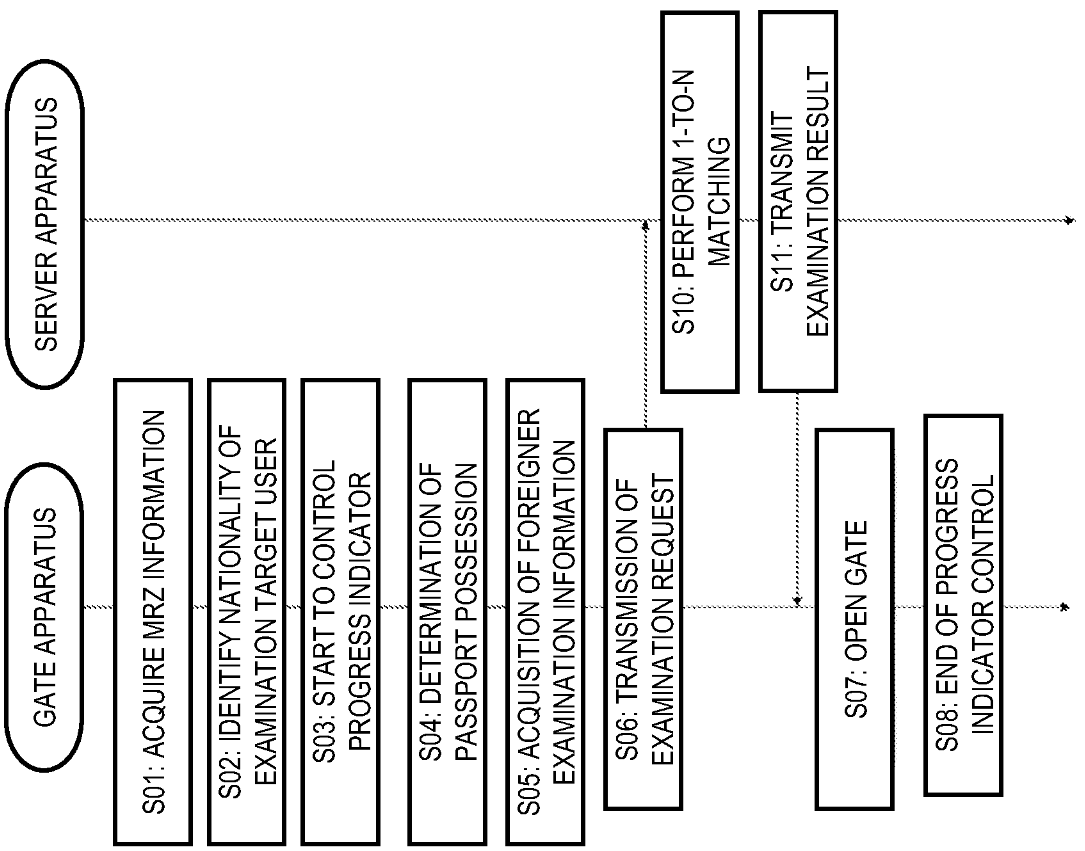
FIG. 11 is a sequence diagram illustrating an example of an operation of the emigration and immigration examination system according to the first example embodiment.

FIG. 11 is a sequence diagram illustrating an example of an operation in an emigration and immigration examination system according to the first example embodiment. FIG. 11 is a sequence diagram illustrating an example of a system operation on a user's boarding date. Prior to an operation shown in FIG. 11, the “gate user information (fingerprint image)” about the user shall be previously registered in the server apparatus 20.

The user who has previously registered the use of the system moves in front of the gate apparatus 10. The gate apparatus 10 acquires MRZ information of the passport possessed by the user (the examination target user) (step S01).

The gate apparatus 10 identifies the nationality of the examination target user based on the MRZ information (step S02).

The gate apparatus 10 starts control of the progress indicator 402 (step S03). In this case, the gate apparatus 10 changes the update control of the progress indicator 402 depending on the nationality of the examination target user.

The gate apparatus 10 performs matching between the two face images (a face image obtained from the camera device 404 and a face image read out from the IC chip) and determines whether the examination target user possesses a correct passport (step S04).

If the examination target user is a foreigner, the gate apparatus 10 acquires information on the ED card or other like (step S05; acquisition of foreigner examination information).

The gate apparatus 10 transmits an examination request including a fingerprint image to the server apparatus 20 (step S06).

The server apparatus 20 performs one-to-N matching using the fingerprint image extracted from the examination request and the fingerprint image registered in the registrant database (step 10).

The server apparatus 20 notifies the gate apparatus 10 of the matching (examination) result (step S11).

The gate apparatus 10 opens the gate 405 when the condition for opening the gate 405 are met (step S07).

When the gate 405 is opened, the gate apparatus 10 ends the control of the progress indicator 402 (step S08). For example, the gate apparatus 10 turns off all the scales forming the progress indicator 402, allowing the person waiting for examination to grasp the "completion of the examination".

As described above, the gate apparatus 10 according to the first example embodiment includes the progress indicator 402 for visually and sensuously notifying the person waiting for the examination of the progress of procedures related to the emigration and immigration examination of the examination target user. The gate apparatus 10 controls the progress indicator 402 so that the person waiting for the examination can predict the timing (time) at which the emigration and immigration examination in progress will be completed regardless of the nationality of the examination target user. Specifically, when the examination target user is Japanese, the speed at which the scale of the progress indicator 402 has been turned off is controlled to be relatively faster. In contrast, when the examination target user is a foreigner, the speed at which the scale has been turned off is controlled to be relatively slow. The person waiting for examination who comes into contact with the progress indicator 402 controlled in this manner can instantly grasp whether the speed at which the scale decreases is fast or slow, or whether there are many or few scales left until the completion. That is, the examination target user can easily grasp the status of the emigration and immigration examination and select and line up at the gate apparatus 10 which is expected to complete the emigration and immigration examination faster.

The resolution of the progress indicator 402 is preferably high, because the person waiting for the examination predicts the completion of the examination based on the speed at which the display of the progress indicator 402 has been updated (the speed at which the scale has been turned off). That is, the greater the number of scales in the progress indicator 402 is, the more frequently the progress indicator 402 is updated, making it easier for the person waiting for examination to realize the difference between the time required for the examination of a Japanese and the time required for the examination of a foreigner.

Second Example Embodiment

Next, a second example embodiment will be described in detail with reference to the drawings.

In the second example embodiment, different controls of the progress indicator 402 will be described. The configuration of the emigration and immigration examination system according to the second example embodiment, the configuration of the gate apparatus 10, the configuration of the server apparatus 20, or the like can be the same as those of the first embodiment. Thus, a description corresponding to FIG. 2 or the like will be omitted. The following description will be made with a focus on the difference between the first and second example embodiments.

The progress indicator control unit 303 according to the second example embodiment controls the display of the progress indicator 402 depending on the status of emigration and immigration examination (examination procedure). For example, the number of scales of the progress indicator 402 is set to 3.

As described above, there are three main procedures when the examination target user is a foreigner, and two main procedures when the examination target user is a Japanese.

Since the number of procedures when the examination target user is a foreigner matches the number of scales of the progress indicator 402, the progress indicator control unit 303 reduces (turns off) one scale every time the procedure is completed.

Figure 12A:
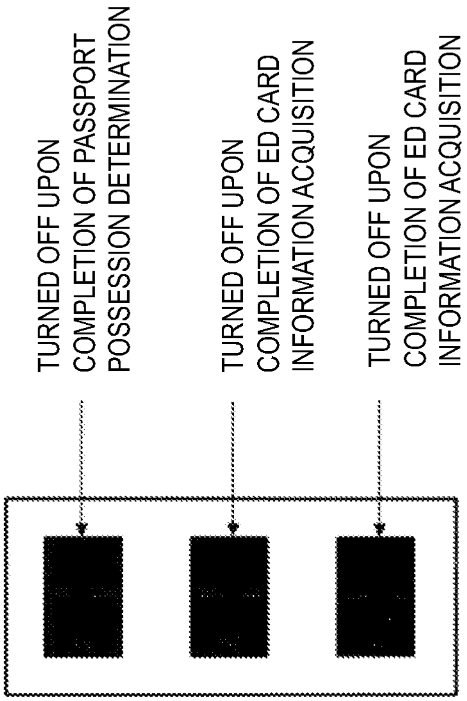
FIGS. 12A and 12B are diagrams illustrating a control of a progress indicator according to a second example embodiment.

For example, as shown in FIG. 12A, the uppermost scale is turned off when the gate apparatus 10 determines that the examination target user possesses a correct passport. The middle scale is turned off when the gate apparatus 10 is completed the acquisition of the information described on the ED card from the examination target user (foreign examination target user). The lowermost scale is turned off when the gate apparatus 10 receives the result of fingerprint matching (the result of permission of emigration and immigration) from the server apparatus 20.

Since the number of procedures when the examination target user is a Japanese does not match the scale number of the progress indicator 402, the progress indicator control unit 303 cannot control the progress indicator 402 as in the case of a foreigner. In this case, the progress indicator control unit 303 turns off the first scale when the first procedure starts. Next, the progress indicator control unit 303 turns off the second scale when the above first procedure started is completed. Finally, the progress indicator control unit 303 turns off the third scale when the second procedure is completed. The progress indicator control unit 303 may control the display of the progress indicator 402 at the start and end of other procedures, not only the first procedure. That is, the progress indicator control unit 303 may advance the display of the progress indicator 402 at the start of a particular procedure, and may further advance the display of the progress indicator 402 at the end of the particular procedure in the examination of the examination target user.

Figure 12B:
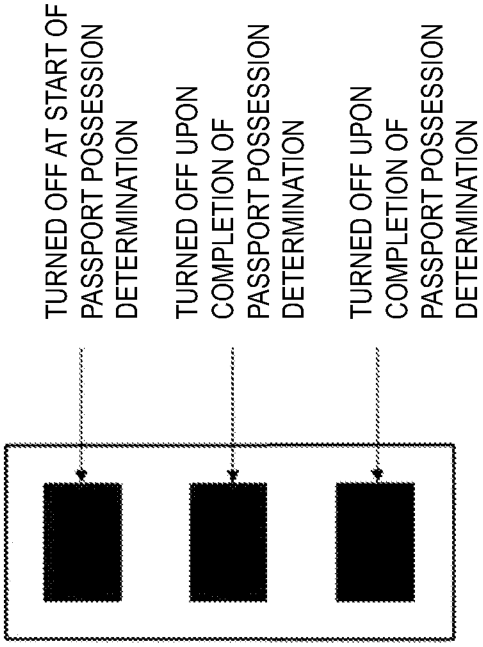

For example, as shown in FIG. 12B, the uppermost scale is turned off when the gate apparatus 10 starts the passport possession determination. The middle scale is turned off when the gate apparatus 10 determines that the examination target user possesses a correct passport. The lowermost scale is turned off when the gate apparatus 10 receives the result of fingerprint matching (the result of permission of emigration and immigration) from the server apparatus 20.

In order to realize the control of the progress indicator 402, each processing module (a passport possession determination unit 304, a foreigner examination information acquisition unit 305, a fingerprint image acquisition unit 306, and an examination request unit 307) of the gate apparatus 10 notifies the progress indicator control unit 303 of the operation state.

The control of the progress indicator 402 described above is illustrative. For example, when the examination target user is Japanese, the progress indicator control unit 303 may turn off the first scale at the same time as the passport possession determination is completed, and may turn off the second scale at the same time as the examination request is transmitted. The progress indicator control unit 303 may control the scale of the progress indicator 402 depending on the status of emigration and immigration examination for the examination target user. Thus, the progress indicator control unit 303 changes the control of the progress indicator depending on the different number of examination procedures depending on the nationality of the examination target user.

As described above, the gate apparatus 10 according to the second example embodiment controls the progress indicator 402 depending on the status of emigration and immigration examination for the examination target user. As a result, as in the first embodiment, the person waiting for examination can easily grasp the status of emigration and immigration examination and select and line up at the gate apparatus 10 which is expected to complete the emigration and immigration examination earlier.

[Variation]

The configuration, operation or the like of the emigration and immigration examination system according to the above example embodiments have been described as examples, and the above description is not intended to limit the system configurations or the like.

For example, the functions of the server apparatus 20 may entirely or partially be realized by the gate apparatus 10. For example, a registrant database may be established in the gate apparatus 10, and the gate apparatus 10 may use the database to perform the examination regarding the emigration and immigration of the examination target user. Alternatively, the registrant database provided in the server apparatus 20 may be established in another database server.

In the above embodiment, after determining whether the examination target user possesses a correct passport, it is determined whether the fingerprint image acquired from the examination target user is registered in the server apparatus 20. However, these two determinations may be performed in parallel, or the order of the execution may be reversed. That is, after determining whether the fingerprint image is registered in the server apparatus 20, a determination whether the person possesses a correct passport may be performed.

In the above embodiment, the fingerprint image acquired by the gate apparatus 10 is used to identify users who have completed emigration and immigration examination in advance, but it may also be used to confirm that the user is not a criminal or the like. For example, the server apparatus 20 may perform a matching using the acquired fingerprint image and the fingerprint image stored in the blacklist that the fingerprints of the criminals are collected.

In the above embodiment, the case where the biological information of the fingerprint image is stored in the server apparatus 20 has been described, but other biological information may be stored in the server apparatus 20. For example, the face image, the voiceprint information, the iris information or the like, and their feature values may be stored as the biological information. Similarly, when biological information other than the face image can be acquired from the passport, the biological information other than the face image may be used to determine whether the examination target user possesses a correct passport.

The data transmission and reception modes between the gate apparatuses 10 and the server apparatus 20 are not limited to any particular modes, and the data transmitted and received between these apparatuses may be encrypted. The fingerprint image is personal information, and to appropriately protect the personal information, it is desirable that encrypted data is transmitted and received. In addition, the gate apparatus 10 may send an examination request with a digital signature to the server apparatus 20. The server apparatus 20 may process the acquired examination request if the digital signature is successfully verified. Thus, the server apparatus 20 may be able to verify the legitimacy of the gate apparatus 10, which is the transmission source of the examination request, by verifying the digital signature.

In the above embodiment, the gate apparatus 10 identifies the nationality of the examination target user from the MRZ information, but it may also identify the nationality based on other information. For example, the gate apparatus 10 may identify the nationality of the examination target user by reading out the nationality from the IC chip of the passport. Alternatively, the gate apparatus 10 may determine the nationality of the examination target user when the nationality obtained from the MRZ information matches the nationality obtained from the IC chip.

The above example embodiments have been described based on a case where information is acquired from IC chips in passports by using MRZ information. However, the technique according to the present application is also applicable to other methods. That is, information corresponding to MRZ information may be used to read out information from an IC chip mounted on a card or the like similar to a passport.

The above embodiment describes a case in which the control of the progress indicator 402 is changed between Japanese and foreigners. However, the gate apparatus 10 may further specify the nationality of a foreigner in more detail and control the progress indicator 402 based on the subdivided nationality. For example, if the contents of the examination are different between foreign country A and foreign country B, the gate apparatus 10 may determine whether the nationality of the examination target user falls under either the foreign country A or the foreign country B, and control the progress indicator 402 depending on the determination result. Specifically, the gate apparatus 10 sets a value different between the foreign country A and the foreign country B in the progressive interval. Alternatively, the control of the progress indicator 402 may be changed based on the frequency of immigration and emigration. For example, since it can be determined that a person who has performed emigration and immigration procedures more than a predetermined number of times during a predetermined period is accustomed to operating the gate apparatus 10, the progress of the progress indicator 402 is accelerated. Alternatively, the control of the progress indicator 402 may be changed depending on whether the advance registration for use of the gate apparatus 10 has been performed in advance. Specifically, the progress of the progress indicator 402 may be accelerated for a user who has completed the registration procedure related to the system use in advance. In addition, since it is possible that the number of procedures at gate apparatus 10 may be omitted for a person who has performed emigration and immigration procedures more than a predetermined number of times during a predetermined period or for a person who has pre-registered, in which case the progress of the progress indicator 402 may be accelerated.

Figure 13:
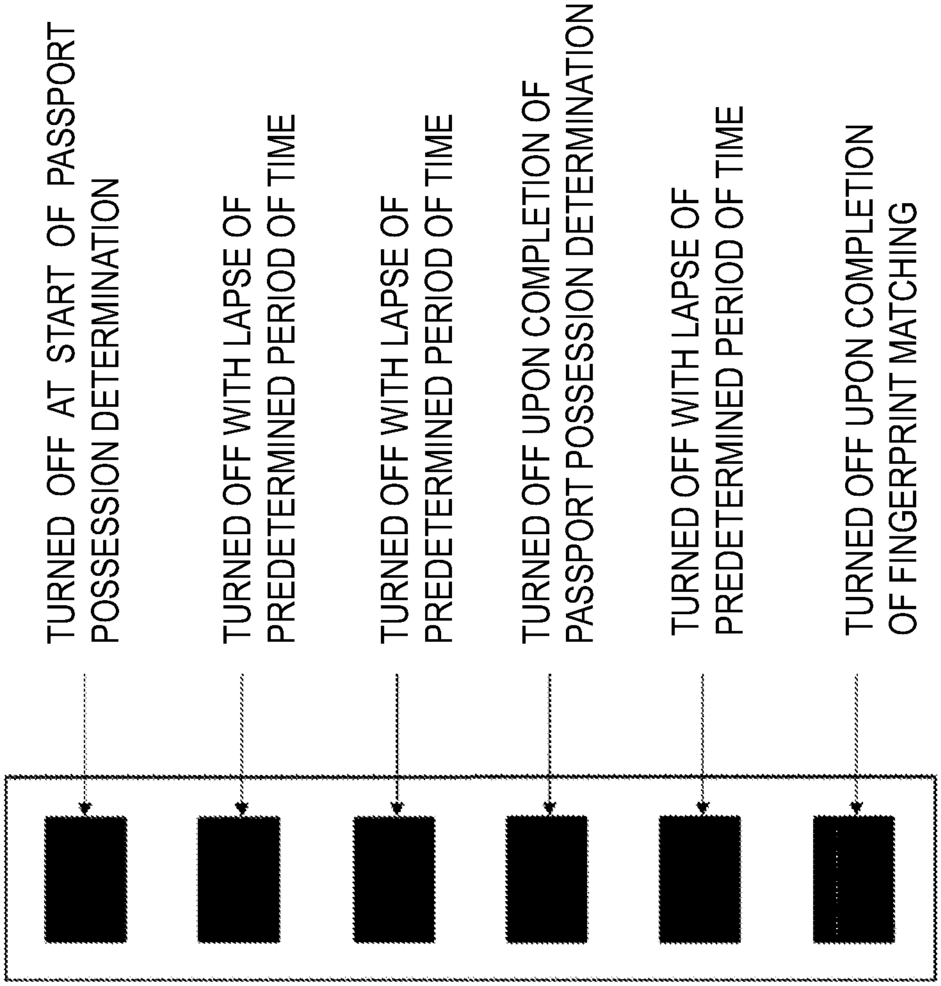
FIG. 13 is a diagram illustrating a control of a progress indicator.

The control of the progress indicator 402 described in the first and second example embodiments may be combined. Specifically, the progress indicator control unit 303 may advance the display of the progress indicator 402 at the start of a certain procedure, advance the display of the progress indicator 402 with the lapse of time during the progress of the procedure, and advance the display of the progress indicator 402 at the end of the procedure. For example, the examination target user shall be Japanese and the progress indicator 402 shall include 6 scales (see FIG. 13). In this case, the progress indicator control unit 303 turns off the first scale at the start of the passport possession determination. Thereafter, the progress indicator control unit 303 turns off the second and third scales with the lapse of a predetermined time. Further, the progress indicator control unit 303 turns off the fourth scale at the same time as the passport possession determination is completed.

In the above embodiment, the explanation is based on the assumption that the gate apparatus 10 is installed in Japan. However, it is needless to say that the present disclosure is also applicable to gate apparatus 10 installed outside of Japan. For example, the present disclosure could be applied in cases where users of nationality C are exempted from certain procedures (e.g., fingerprint collecting), while users of nationality D are required to follow such specific procedures. In other words, the present disclosure is applicable to the case where the contents of the examination changes depending on the nationality of the examination target user of the emigration and immigration.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to emigration and immigration examination systems at airports.

A part or the entirety of the example embodiments described above may be described as in the following supplementary notes, but is not limited to the followings.

[Supplementary Note 1]

A gate apparatus including:

a progress indicator that indicates progress of procedures related to an emigration and immigration examination of an examination target user; and a control unit that controls the progress indicator depending on a nationality of the examination target user.

[Supplementary Note 2]

The gate apparatus according to supplementary note 1, further including an acquisition unit for acquiring information described in a machine readable zone of a passport, wherein the control unit identifies the nationality of the examination target user based on the information described in the machine readable zone.

[Supplementary Note 3]

The gate apparatus according to supplementary note 1 or 2, wherein the control unit controls the progress indicator so that a person waiting for examination can recognize a timing when the emigration and immigration examination in progress will be completed.

[Supplementary Note 4]

The gate apparatus according to supplementary note 3, wherein the control unit controls the progress indicator using a progressive interval that defines an interval upon advancing a display of the progress indicator from an initial state toward an end-of-examination state related to the emigration and immigration examination of the examination target user.

[Supplementary Note 5]

The gate apparatus according to supplementary note 4, wherein the control unit changes a value to be set for the progressive interval depending on the nationality of the examination target user.

[Supplementary Note 6]

The gate apparatus according to supplementary note 5, wherein the value to be set for the progressive interval is determined based on an average value of time required for the emigration and immigration examination for each user of different nationalities.

[Supplementary Note 7]

The gate apparatus according to any one of supplementary notes 4 to 6, wherein a value of the progressive interval set when the examination target user is a Japanese is smaller than a value of the progressive interval set when the examination target user is a foreigner.

[Supplementary Note 8]

The gate apparatus according to any one of supplementary notes 1 to 7, wherein the control unit starts controlling the progress indicator when the nationality of the examination target user can be acquired, and terminates controlling the progress indicator when the emigration and immigration examination of the examination target user is completed.

[Supplementary Note 9]

The gate apparatus according to supplementary note 3, wherein the control unit controls the progress indicator depending on a status of the emigration and immigration examination for the examination target user.

[Supplementary Note 10]

The gate apparatus according to supplementary note 9, wherein the control unit changes the control of the progress indicator depending on a different number of examination procedures depending on the nationality of the examination target user.

[Supplementary Note 11]

The gate apparatus according to supplementary note 9 or 10, wherein the control unit advances the display of the progress indicator at a start of a particular procedure and further advances the display of the progress indicator at an end of the particular procedure in the examination of the examination target user.

[Supplementary Note 12]

The gate apparatus according to any one of supplementary notes 3 to 7, wherein the progress indicator is installed in a position that is visible to the person waiting for examination.

[Supplementary Note 13]

A control method of a gate apparatus including a progress indicator that indicates progress of procedures related to an emigration and immigration examination of an examination target user, the method including:

identifying a nationality of the examination target user; and controlling the progress indicator depending on the identified nationality of the examination target user.

[Supplementary Note 14]

A computer-readable storage medium, storing a program that causes a computer mounted on a gate apparatus, the gate apparatus being including a progress indicator that indicates progress of procedures related to an emigration and immigration examination of an examination target user, to perform processing for:

identifying a nationality of an examination target user; and controlling a progress indicator depending on the identified nationality of the examination target user.

The supplementary notes 13 and 14 can be expanded in the same way as the supplementary note 1 can be expanded into the supplementary note 2 to the supplementary note 12.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST

10, 10-1 to 10 3, 100 gate apparatus
20 server apparatus
101, 402 progress indicator
102 control unit
201, 301 communication control unit
202 fingerprint image registration unit
203 screening part
204, 309 storage part
211, 311 processor
212, 312 memory
213 input-output interface
214, 313 communication interface
302 MRZ information acquisition unit
303 progress indicator control unit
304 passport possession determination unit
305 foreigner examination information acquisition unit
306 fingerprint image acquisition unit
307 screening request part
308 gate control unit
401 display
404 camera device
405 gate
406 ceiling

What is claimed is:

1. A gate apparatus comprising:

a progress indicator that indicates progress of procedures related to an emigration and immigration examination of an examination target user;

at least one memory storing a set of instructions; and at least one processor configured to execute the set of instructions to:

control the progress indicator depending on a nationality of the examination target user, control the progress indicator so that a person waiting for examination can recognize a timing when the emigration and immigration examination in progress will be completed, control the progress indicator using a progressive interval that defines an interval upon advancing a display of the progress indicator from an initial state toward an end-of-examination state related to the emigration and immigration examination of the examination target user, and change a value to be set for the progressive interval depending on the nationality of the examination target user.

2. The gate apparatus according to claim 1, wherein the at least one processor is further configured to execute the set of instructions to:

acquire information described in a machine readable zone of a passport; and identify the nationality of the examination target user based on the information described in the machine readable zone.

3. The gate apparatus according to claim 1, wherein the value to be set for the progressive interval is determined based on an average value of time required for the emigration and immigration examination for each user of different nationalities.

4. The gate apparatus according to claim 1, wherein the at least one processor is further configured to execute the set of instructions to:

start controlling the progress indicator when the nationality of the examination target user can be acquired; and terminate controlling the progress indicator when the emigration and immigration examination of the examination target user is completed.

5. The gate apparatus according to claim 1, wherein the at least one processor is further configured to execute the set of instructions to:

control the progress indicator depending on a status of the emigration and immigration examination for the examination target user.

6. The gate apparatus according to claim 5, wherein the at least one processor is further configured to execute the set of instructions to:

change the control of the progress indicator depending on a different number of examination procedures depending on the nationality of the examination target user.

7. The gate apparatus according to claim 1, wherein a value of the progressive interval set when the examination target user is a Japanese is smaller than a value of the progressive interval set when the examination target user is a foreigner.

8. The gate apparatus according to claim 5, wherein the at least one processor is further configured to execute the set of instructions to:

advance the display of the progress indicator at a start of a particular procedure; and further advance the display of the progress indicator at an end of the particular procedure in the examination of the examination target user.

9. The gate apparatus according to claim 1, wherein the progress indicator is installed in a position that is visible to the person waiting for examination.

10. A control method of a gate apparatus comprising a progress indicator that indicates progress of procedures related to an emigration and immigration examination of an examination target user, the method comprising:

identifying a nationality of the examination target user;

controlling the progress indicator depending on the identified nationality of the examination target user;

controlling the progress indicator so that a person waiting for examination can recognize a timing when the emigration and immigration examination in progress will be completed;

controlling the progress indicator using a progressive interval that defines an interval upon advancing a display of the progress indicator from an initial state toward an end-of-examination state related to the emigration and immigration examination of the examination target user; and changing a value to be set for the progressive interval depending on the identified nationality of the examination target user.

11. A non-transitory computer-readable storage medium, storing a program that causes a computer mounted on a gate apparatus, the gate apparatus comprising a progress indicator that indicates progress of procedures related to an emigration and immigration examination of an examination target user, to perform processing for:

identifying a nationality of the examination target user;

controlling the progress indicator depending on the identified nationality of the examination target user, controlling the progress indicator so that a person waiting for examination can recognize a timing when the emigration and immigration examination in progress will be completed;

controlling the progress indicator using a progressive interval that defines an interval upon advancing a display of the progress indicator from an initial state toward an end-of-examination state related to the emigration and immigration examination of the examination target user; and changing a value to be set for the progressive interval depending on the identified nationality of the examination target user.

* * * * *